United States Patent
Haubs et al.

(10) Patent No.: US 10,562,381 B2
(45) Date of Patent: Feb. 18, 2020

(54) SLIDING DOOR DRIVE OF A MOTOR VEHICLE

(71) Applicant: Kiekert AG, Heiligenhaus (DE)

(72) Inventors: Rainer Haubs, Voerde (DE); Rainhard Chilla, Velbert (DE)

(73) Assignee: Kiekert AG, Heiligenhaus (DE)

( * ) Notice: Subject to any disclaimer, the term of this patent is extended or adjusted under 35 U.S.C. 154(b) by 22 days.

(21) Appl. No.: 15/759,282

(22) PCT Filed: Sep. 7, 2016

(86) PCT No.: PCT/DE2016/100413
§ 371 (c)(1),
(2) Date: Mar. 12, 2018

(87) PCT Pub. No.: WO2017/041789
PCT Pub. Date: Mar. 16, 2017

(65) Prior Publication Data
US 2018/0179802 A1 Jun. 28, 2018

(30) Foreign Application Priority Data

Sep. 10, 2015 (DE) .................. 10 2015 115 222

(51) Int. Cl.
*B60J 5/06* (2006.01)
*E05F 15/655* (2015.01)
*E05F 15/643* (2015.01)

(52) U.S. Cl.
CPC ........... *B60J 5/06* (2013.01); *B60J 5/062* (2013.01); *E05F 15/643* (2015.01); *E05F 15/655* (2015.01); *E05Y 2201/662* (2013.01); *E05Y 2201/668* (2013.01); *E05Y 2600/60* (2013.01); *E05Y 2800/17* (2013.01); *E05Y 2800/72* (2013.01); *E05Y 2900/531* (2013.01)

(58) Field of Classification Search
CPC .............. B60J 5/06; B60J 7/062; B60J 5/062
USPC .................... 296/155; 49/209, 360
See application file for complete search history.

(56) References Cited

U.S. PATENT DOCUMENTS

| 5,809,696 A * | 9/1998 | Watanabe | E05F 15/646 49/360 |
| 6,009,671 A * | 1/2000 | Sasaki | E05F 15/41 296/146.1 |
| 6,198,048 B1 * | 3/2001 | Juhel | H02G 15/007 174/70 A |

(Continued)

FOREIGN PATENT DOCUMENTS

| DE | 10 2006 046 569 A1 | 4/2008 |
| DE | 10 2006 046 602 A1 | 4/2008 |

(Continued)

*Primary Examiner* — Dennis H Pedder
(74) *Attorney, Agent, or Firm* — Renner, Otto, Boisselle & Sklar, LLP

(57) ABSTRACT

The invention relates to a drive of a sliding door of a motor vehicle comprising an electric drive unit (2), a drive cable (10) and a guide (3) for the drive cable (10). Said drive unit (2), the drive cable (10) and the guide (3) are fixed in the vehicle body (K) and the sliding door can be moved by means of the drive cable (10) with respect to the vehicle body. At least one sub-assembly (33) of the guide (3) of the drive cable (10) is modular and the drive cable (10) can be deflected by the modular sub-assembly (33).

11 Claims, 3 Drawing Sheets

(56) References Cited

U.S. PATENT DOCUMENTS

Figure 1:
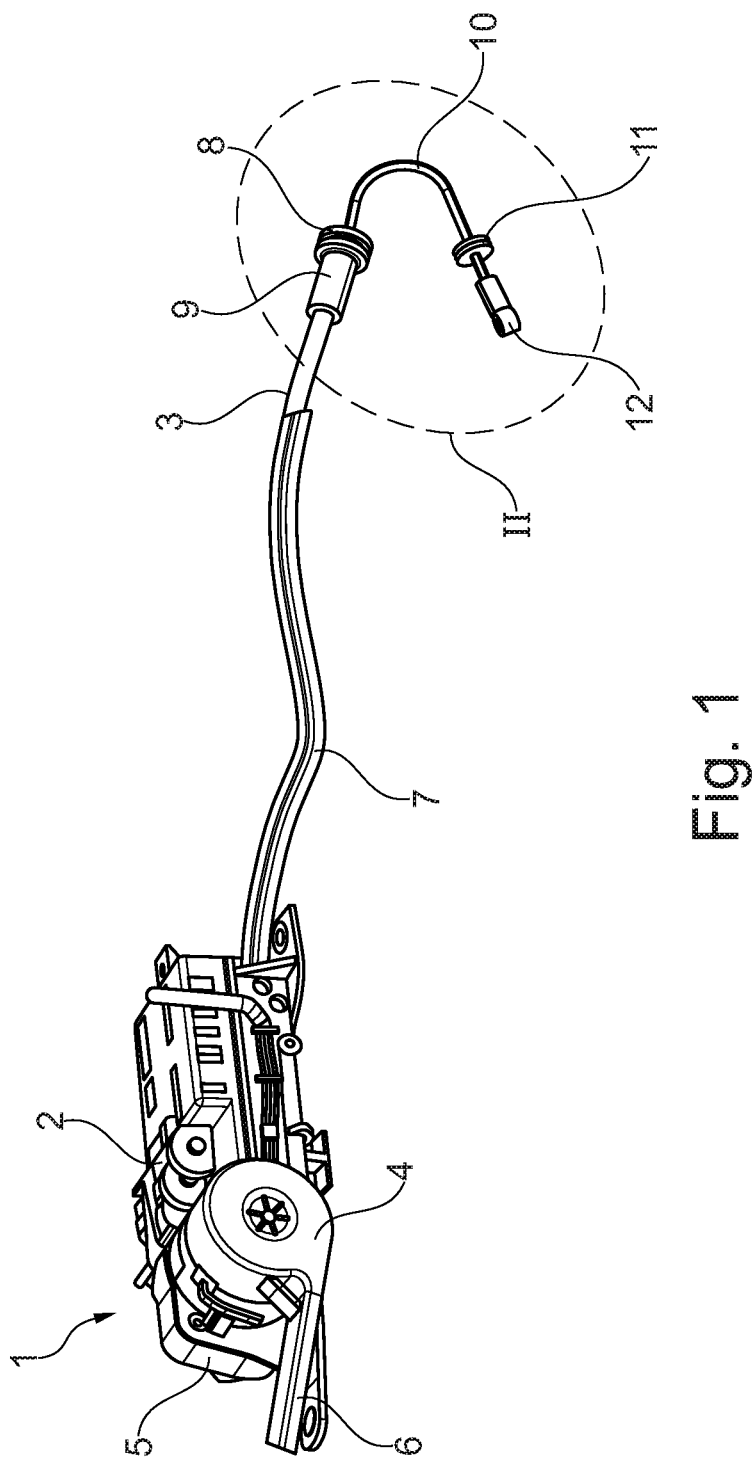

| | | | | |
|---|---|---|---|---|
| 6,866,250 | B2* | 3/2005 | Kita | E05F 15/646 |
| | | | | 254/225 |
| 7,325,361 | B2* | 2/2008 | Rogers, Jr. | E05F 15/643 |
| | | | | 296/155 |
| 7,341,304 | B2* | 3/2008 | Osada | B60J 5/06 |
| | | | | 296/146.1 |
| 7,872,470 | B2* | 1/2011 | Booth | E05F 15/646 |
| | | | | 324/165 |
| 10,023,031 | B2* | 7/2018 | Atomura | E05F 15/655 |
| 2004/0195419 | A1* | 10/2004 | Yamagishi | E05F 15/646 |
| | | | | 242/365.6 |
| 2016/0060942 | A1* | 3/2016 | Hansen | E05F 15/643 |
| | | | | 49/349 |

FOREIGN PATENT DOCUMENTS

| | | |
|---|---|---|
| EP | 1 905 629 A2 | 4/2008 |
| EP | 2 907 954 A1 | 8/2015 |
| GB | 2 311 809 A | 10/1997 |
| JP | 2001 115736 A | 4/2001 |

* cited by examiner

SLIDING DOOR DRIVE OF A MOTOR VEHICLE

The invention relates to a sliding door drive of a motor vehicle having an electrical drive unit, a drive rope and a guide for the drive rope, whereby the drive unit, the drive rope and the guide are firmly accommodated in a chassis of the motor vehicle and the sliding door can be moved in respect of the chassis by means of the drive rope.

In order to facilitate operation of a sliding door in a motor vehicle, especially in order to facilitate operation for children, for example, sliding doors are equipped with drives so that only an initialization needs to take place in order to open or close the sliding door. Initialization can occur by means of remote control or a push button or a switch. The sliding door is usually closed or opened by means of an electrical drive. For this purpose, the sliding door usually glides in guide rails along the motor vehicle and moves in respect of the chassis.

As sliding doors can uncover and cover large openings, for example on transporters, on the one hand a suitable drive must be provided with an appropriate output and it must be ensured that the means for driving the sliding door must be able to transmit this force accordingly. If, on the one hand, force transmission and provision is important, on the other hand a guide of the force transmission means and its installation in the motor vehicle is also an important component for a durable function of the sliding door. To fulfil these requirements, different drive systems and installation formations have become known.

DE 10 2005 046 602 A1 reveals a drive for a sliding door for a motor vehicle, whereby the sliding door can be moved along a guide rail by means of a drive rope. The drive rope is wound on and off a rope drum by means of an electrical motor gearbox unit. A respective end of the drive rope pulls the sliding door either in an opening or a closure direction. In order to enable proper initiation of force in both directions of movement, the drive rope is guided by means of deflection devices. The drive rope is deflected by approximately 90° on the respective drive-side deflection device and is transferred from its course in a lengthwise direction of the motor vehicle into such a course in a transverse direction in order to then plunge into the guide rail. The drive unit and the deflection devices located at the respective ends of the drive unit are formed as a uniform module so that safe deflection and also provision of the necessary force to move the sliding door can be provided.

From DE 10 2006 046 569 A1, a class-specific electrical drive has also become known for a sliding door of a motor vehicle. The sliding door drive encompasses an electromotor which interacts with a planetary gear and which drives a rope drum by means of which the drive rope can be wound on and a force on the sliding door can be moved backwards and forwards in the guide rail in both directions of movement, the drive rope is guided by means of deflection devices so that the sliding door can be pulled backwards and forwards in both directions of movement by means of the drive rope. So that a force can be applied on the flexible drive means, the drive rope or the flexible drive means must be securely guided on the respective deflection devices and must be firmly connected to the chassis. The drive device is executed as a uniform constructional unit and is installed as a complete constructional unit accordingly. By means of the formation of a firm constructional unit, a secure backwards and forwards movement of the sliding door is guaranteed.

As the distances, i.e. the path of the movement of the sliding door can also be long for large doors, it is necessary according to the embodiment and width or size of the sliding door to install at least a deflection device at a great distance from the drive unit in the motor vehicle. In particular, the installation of the distant deflection device and the guidance can be connected with effort between the external and internal panel of the vehicle.

A problem arising in the development of sliding door drives is thus that, on the one hand, sufficient force is provided, that on the other hand the force can be further transmitted properly to the sliding door to be moved and, furthermore, easy installation of the drive unit into the chassis of the motor vehicle must be guaranteed.

The task of the invention is to provide an improved sliding door drive. Furthermore, a task of the invention is to provide a sliding door drive for a motor vehicle which enables safe deflection of the required forces for movement of the sliding doors and which, on the other hand, is easy to install in the motor vehicle. Another task of the invention is to provide a structurally simple and cost-effective possibility for movement and driving a sliding door of a motor vehicle.

According to the invention, the task is solved by the characteristics of independent patent claim 1. Advantageous embodiments of the invention are specified in the sub-claims. It is pointed out that the exemplary embodiments described hereafter are not restrictive; instead, any possible variations are possible of the characteristics described in the description, the sub-claims and the drawings.

According to patent claim 1, the invention is solved by a drive of a sliding door of a motor vehicle being provided having an electrical drive unit, a drive rope and a guide for the drive rope, where the drive unit, the drive rope and the guide are firmly accommodated in a chassis of the motor vehicle and the sliding door can be moved in respect of the chassis by means of the drive rope, where at least an assembly of the guide of the drive rope is of a modular construction and the drive rope can be deflected by means of a modular assembly. By means of the modular construction of the drive unit of the sliding door, the possibility is now created on the one hand of providing safe deflection of the force required for movement of the door and on the other hand of enabling easy installation of the sliding door drive unit. The formation of the deflection unit as a separate assembly and in the form of a module offers the possibility of installing the rope deflection assembly separately and according to an installation of the sliding door drive on the drive and the motor vehicle. Thus, the deflection device at a distance from the drive cannot be guided during installation between the external and internal panel of the motor vehicle, but only the motor gearbox unit must be installed.

An electromotorized drive is viewed as a drive of a sliding door of a motor vehicle according to the invention which is able to guide, wind and drive the drive rope in such a way that a sliding door moves along and in relation to a chassis of a motor vehicle in a guide rail. The drive is preferably equipped with a gearbox and, even more preferably with a planetary gear, so that a movement of the sliding door can provide the necessary force.

Furthermore, the use of a planetary gear offers the possibility of uncoupling the electrical drive from the rope and thus from the sliding door. This can be advantageous, for example, if the sliding door should or needs to be moved manually during a power outage. Advantageously, an electrical drive is offered in the form of an electromotor as electrical energy is available in the motor vehicle. A drive rope serves as a drive means. A drive rope offers the advantage of being easily deflectable and can easily be guided into a guide pipe through the chassis in the direction of the deflection device. Furthermore, the use of a guide rope offers a cost-effective structural solution in order to adapt the electrical drive unit to different constructions and dimensions of the sliding door. If, for example, work takes place with a drive and the drive is used for doors of different widths, i.e. if openings of different sizes are used in the motor vehicle, only a component of the guide of the rope needs to be replaced and the length of the rope can be adjusted. It is therefore easy to adjust the drive unit to different requirements.

In order to guide the drive rope from the drive to the deflection devices, guides are provided for the drive rope. For example, a guide can consist of a guide pipe which guides the drive rope through the chassis in the direction of the rope deflection assembly. In order that the drive unit can move the sliding door properly, the drive unit and the guide for the drive rope can be firmly accommodated in the motor vehicle. The drive rope is wound on in the drive, guided through the guides and guided out of the drive unit in the area of the rope deflections so that it can be connected to the sliding door and/or a means for moving the sliding door.

Advantageously, the rope deflector at least the assembly at a distance from the electrical drive unit forms a modular rope deflector. Modular means that the rope deflector can be connected as a separate component to the drive or the guide for the drive rope. A modular construction enables the assembly to be installed separately and furthermore to be adjusted to different occurrences in the motor vehicle. A modular construction thus simultaneously offers several advantages. On the one hand, the modular and separate assembly enables the possibility of installing the rope deflector only after installation of the electrical drive unit and furthermore the advantage of easy adaptability to different circumstances in the motor vehicle chassis. Different modules can thus be provided for a drive which can be installed on the electrical drive unit as separate assemblies. For example, different modules can be used if two sliding doors exist in a motor vehicle so that a module on one side of the motor vehicle and another module is used on the opposite side of the motor vehicle. Thus, the entire assembly does not need to be changed, but only the rope deflector modular assembly needs to be replaced, for example.

According to the invention, the sliding door drive has a drive rope in its basic construction which protrudes from the guide. Advantageously, for example, a ball socket can be attached to the rope end of the drive rope which can then be connected to a drive slide which is guided in a guide rail. An advantageous configuration results if a rope end of the drive rope can be threaded into at least one rope deflector. As the rope end can now be threaded into the rope deflector, the possibility now exists of installing a connecting means for a slide, for example, at the end of the rope. The insertion of the rope end into the rope deflector assembly also offers the advantage of being able to insert the ready-mounted drive rope into the rope deflector and thus creating a structurally simple possibility to provide a rope deflector for the sliding door drive at a distance.

In an alternative embodiment of the invention an advantage results if the rope guide has a rope guide pipe and the rope guide pipe has a holding means. A holding means at one end of the guide pipe enables secure connection of the guide pipe with the rope deflector. A holding means can, for example, be formed as a single component on the rope guide pipe and, for example, be formed from compression, thickening or molding on the rope guide pipe. If, for example, a molding is present in the form of an opening on the rope guide pipe, this opening can be connected to an elevation or a bolt on the rope deflector so that secure fixing of the rope guide pipe can be guaranteed with the rope deflector.

Furthermore, form-fitting connections are naturally conceivable as cooperating elevations and/or depressions between the rope deflector and the rope guide pipe. Furthermore, the holding means can also be connected as a separate component with the rope guide pipe. If, for example, the rope guide pipe is produced from a metallic material, the holding means can, for example, be molded as a plastic injection-molded component to the rope guide pipe or be connected to the rope guide pipe in the form of a fit, for example. The holding means guarantees that a secure connection is present between the rope guide pipe and the rope deflector.

Thus, on the one hand, the position of the drive rope is fixed and, on the other hand, the drive rope is securely guided by the rope deflector. For example, the rope deflector encompasses an accommodation for the holding means, a base plate and a deflection or guide wheel attached to the base plate for the drive rope. The holding means is inserted into the accommodation of the rope deflector or connected to the accommodation. This simultaneously offers the advantage that by means of the formation of the accommodation in the base plate of the rope deflector the arrangement angle of the drive rope can be set to the deflection or guide wheel. On the one hand, the accommodation can be adjustable, however the accommodation can also be formed individually for each module of the assembly so that a rope deflector can be used for every modular assembly. By insertion of the holding means into the rope deflector and in particular the form-fitting insertion of the holding means into the rope deflector a further advantageous configuration of the invention is formed. Advantageously, the holding means can thus guarantee safe guidance and positioning of the drive rope.

If the end of the rope guide and/or the holding means can be fixed by means of an upper section on the rope deflector, a further advantageous configuration of the invention results. By use of an upper section to fix or secure the position of the rope guide and/or the holding means a further possibility is given to execute a modular construction of the deflector device or the rope deflector assembly. According to the holding means and/or the rope guide used, the possibility exists of working with a rope deflector by means of an individual upper section which is adapted to the rope guide or the holding means. In contrast, different rope guides and/or holding means can be adapted to the rope deflector. The upper section envelops the holding means or the rope guide at least in part, but preferably at least largely so that secure fixing to the rope deflector can be guaranteed. The upper section preferably envelops the rope guide and/or the holding means by 180° or more. The holding means or the rope guide can thus be attached to the rope deflector in a secure and structurally simple manner.

A further embodiment of the invention results when a sealing component can be installed on the rope deflector in such a way that the drive rope can be guided out of the motor vehicle chassis by means of the rope deflector. The rope deflector can also be installed in an area which is exposed to external weathering influences by means of a sealing component. This is advantageous in particular if an optimum force attack point should be attained for the sliding door. For this purpose, the deflector and guide wheel can also be encompassed by the sealing component so that the sealing wheel is arranged outside of the chassis, at least in the section surrounding the sealing component. The rope deflector can thus be optimally aligned to a guide slide conducted in the guide rail by means of the sealing component.

Advantageously according to the invention at least the rope deflector, the upper section and the seal form the modular assembly of the sliding door drive. By means of the rope deflector, the bending radius of the rope can be complied with; secure guidance of the rope can be guaranteed and the rope can be aligned in relation to the drive means for the sliding door. Secure fixing of the rope guide and/or the holding means can occur by means of the upper section and the seal also offers the option of optimally aligning the modular assembly to the drive means of the sliding door. A guide slide guided in the guide rail can hereby be described as a drive means. In a further advantageous configuration of the invention, an advantage is then attained if the modular assembly has at least a means to attach the assembly to the motor vehicle chassis.

The integration of an attachment means into the rope deflector module is a structurally simple manner of attaching the complete assembly directly to the chassis. For this purpose, an attachment means, such as a nut or a thread can be engaged or molded into the upper section or the rope deflector, for example. The presence of an attachment means in the rope deflector assembly thus enables very easy and uncomplicated attachment of the assembly in the chassis of the motor vehicle. The solution also constitutes a cost-effective option for securely positioning the rope deflector assembly and fixing it in the chassis. For example, three attachment points or more can be present on the assembly.

If the drive rope has a sealing means, in particular a sealing collar, whereby the sealing means forms a sealing unit with the seal, a further advantageous configuration of the invention is thus attained. If a sealing means is additionally or separately arranged on the drive rope which can already have an attachment or accommodation for the guide slide, a structurally simple solution is thus provided for sealing of the drive rope. A sealing collar attached to the drive rope can be attached directly on the sealing component, for example, placed over the sealing component. This creates the possibility of guaranteeing a tight attachment of the rope deflector modular assembly to the motor vehicle. In particular, a secure sealing of the drive rope can thus be guaranteed in relation to the motor vehicle. It is especially advantageous that the attachment means present at the end of the drive rope can only be installed subsequently so that the sealing means can be circumferentially formed as a single component and only needs to have an opening to guide the drive rope through. A sealing means can thus be provided which enables secure sealing of the drive rope.

In an alternative embodiment, the sealing means can be inserted into the seal. If the sealing means is circular, for example, and has profiling on the circumference, the sealing means can thus be pushed into an opening of the seal, whereby secure sealing of the rope deflector assembly can be attained in turn. Secure sealing and simultaneously a structurally simple solution is thus provided to seal the assembly.

The invention is described in further detail below with reference to the attached drawings on the basis of preferred exemplary embodiments. However, the principle applies that the exemplary embodiments do not restrict the invention, but only constitute advantageous embodiments. The characteristics portrayed can be executed individually or in combination with other characteristics of the description and also the patent claims individually or in combination.

Figure 4:
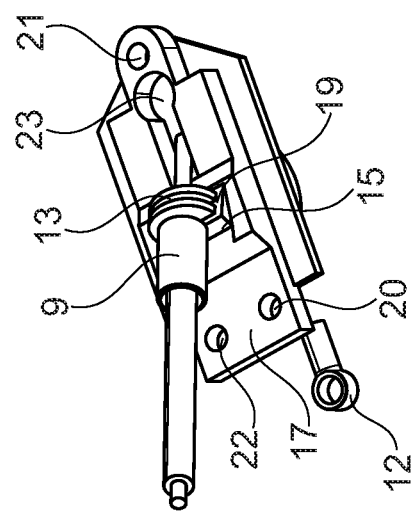
Figure 3:
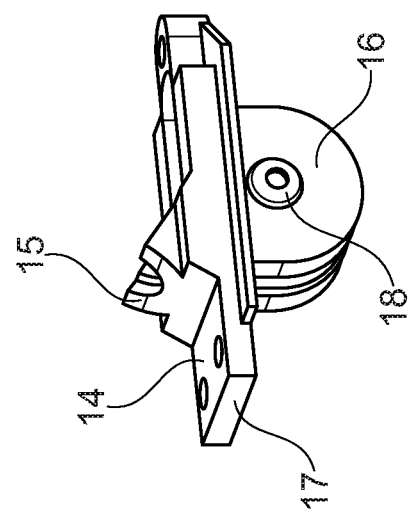
Figure 2:
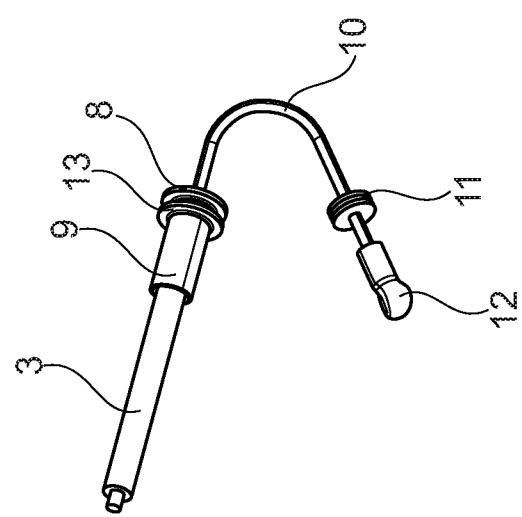
Figure 7:
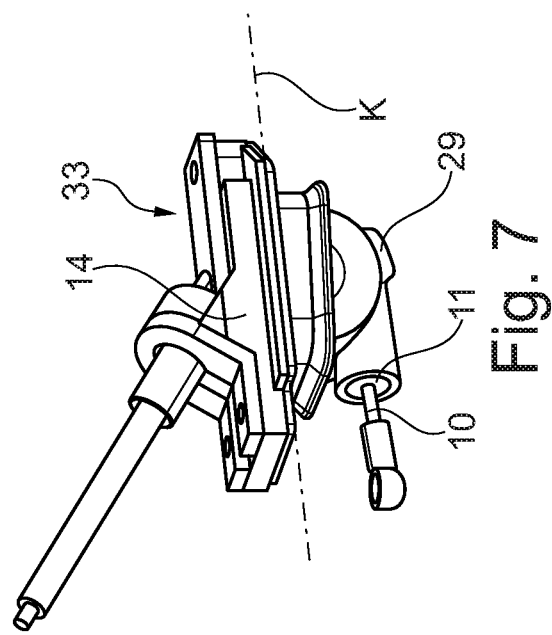
Figure 6:
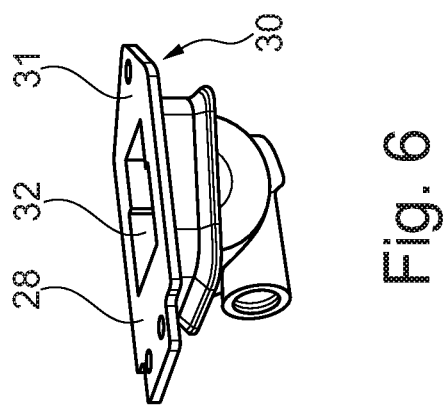
Figure 5:
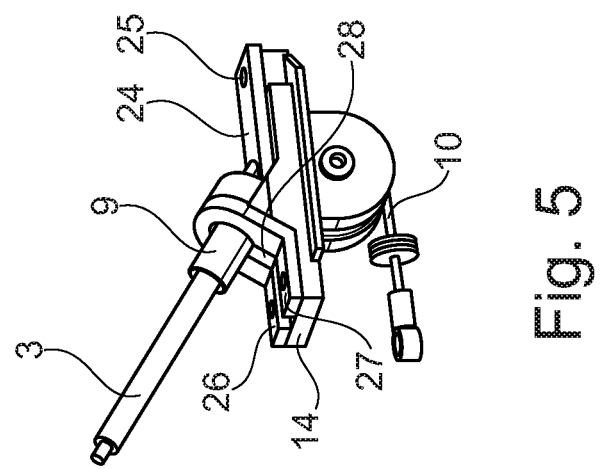

The following are shown:

FIG. 1 a three-dimensional view of a sliding door drive with a guide pipe and a drive rope protruding from the guide pipe without the rope deflector modular assembly, FIG. 2 a detail according to II from FIG. 1 in the area of the end of the rope guide with the end of the drive rope protruding from the guide pipe, FIG. 3 a detailed view of a separate rope deflector illustrated in a three-dimensional view, FIG. 4 a three-dimensional view of the rope deflector with a drive rope inserted into the rope deflector, FIG. 5 a three-dimensional view of a drive rope inserted into the rope deflector with an upper section installed on the rope deflector, FIG. 6 a three-dimensional view of a seal as a separate component of the assembly, and FIG. 7 a three-dimensional view of a modular rope deflector assembly.

In FIG. 1, a three-dimensional view of a sliding door drive 1 which is only illustrated in places is reproduced. The electrical drive unit 2, the rope guide 3, the winding drum 4, a section of the planetary gear 5 are illustrated and an extension 6 of the winding drum 4 is also apparent through which a further drive rope can be guided. The electromotor is arranged at the rear in this view and is not visible. The rope guide 3 is equipped with plastic sheathing 7 in places. A holding means 9 is attached to an end 8 of the rope guide 3 which is opposite the electrical drive unit 2. The drive rope 10 protrudes out of the rope guide 3 or the holding means 9, whereby a sealing means 11 is arranged on the drive rope 10 and a spherical head is arranged at the end of the drive rope 10 which is equipped with a guide slide to move the sliding door.

A detail according to II from FIG. 1 is reproduced in FIG. 2. FIG. 2 shows the end 8 of the rope guide 3, where the rope guide 3 is formed as a metallic pipe in this exemplary embodiment. A holding means is arranged in the form of a plastic bushing on the metallic pipe as a rope guide 3, where the holding means 9 has two circular bulges 13. The holding means 9 is undetachably connected to the rope guide 3, for example. Undetachably hereby means that the holding means 9 is affixed to the rope guide, for example. Naturally, other geometrical configurations of the holding means can be formed at the end of the rope guide 3 or the rope guide 3 itself has a bulge, embossment or opening which can be connected to the rope deflector. The sealing means 11 movably attached to the drive rope 10 is formed in the form of a profiled ring disk. The sealing means can thus be moved beyond the drive rope 10, whereby the drive rope 10 is protected from penetrating moisture by means of sealing means 11, for example.

FIG. 3 shows a rope deflector 14 having an accommodation 15, a deflector guide wheel 16 and a base plate 17. As is clearly apparent, the angle of attack of the drive rope 10 can be adjusted in relation to the deflector or guide roll 16 by means of the accommodation 15. If a larger deflector or guide wheel 16 is present, or if a drive rope 10 is used which requires a larger deflection radius, the accommodation 15 can thus be adjusted to the drive rope 10. In this exemplary embodiment, the base plate 17 and the accommodation 15 are formed as a single component and can be made of plastic or metal, for example. The base plate 17 and the accommodation 15 are preferably made of metal and more preferably of aluminum. Furthermore, the rope deflector 14 has a storage means for the deflector and guide wheel 16, while only an axis 18 of the deflector and guide wheel 16 is apparent in FIG. 3.

The combination of the drive rope 10 inserted into the rope deflector 14 is shown in FIG. 4. It is clearly apparent that the holding means 9 was inserted into the accommodation 15 and in particular the circular bulges 13 into a recess 19 of the accommodation 15. The holding means 9 is thus fixed in position and held in the accommodation 15. In this exemplary embodiment, the accommodation forms an accommodation 15 which envelops the holding means 9 in a semi-circular shape of approximately 180°.

Borings 20, 21, 22 are inserted or molded into the base plate 17 so that attachment means can be guided through the base plate 17 for the rope deflector assembly. A further opening 23 in the base plate 17 hereby enables the spherical head 12 to be guided through the base plate 17 and thus to guide the drive rope 10 around the deflector and guide roll 16.

A further three-dimensional view of the rope deflector 14 is reproduced with the drive rope 10 inserted in FIG. 5. Additionally, the rope guide 3 or the holding means 9 is fixed on the rope deflector 14 by means of an upper section 24. The holding means 9 is thus completely fixed, positioned and held securely in place on the rope deflector 14. The upper section 24 can have attachment means 25, 26, 27 in addition to the fixing of the holding means so that the rope deflector 14, and also the upper section 24, can be fixed and installed in a motor vehicle chassis. A slit 28 hereby enables the upper section 24 to be joined by means of the holding means 9.

A seal 6 is reproduced as a separate component in FIG. 6. The seal 29 has two contact surfaces 30, 31. The seal 29 can become adjacent to a non-illustrated chassis by means of the contact surface 30. In contrast, the contact surface 30 lies adjacent against the base plate 17 of the rope deflector 14. The deflector and guide wheel 16 can be inserted into the mold 32.

The rope deflector 33 assembly is reproduced as a complete assembly in FIG. 7. In the installed state, the rope deflector 33 assembly becomes adjacent against a chassis depicted as a dot-dashed line. The seal 29 seals off the rope deflector 14, whereby the sealing means 11 seals the drive rope 10. The modular construction of the rope deflector 33 assembly thus creates the option of installing the rope deflector 33 assembly separately as an assembly 33 at a distance from the drive unit 2. Furthermore, the rope deflector 33 assembly offers several options to adapt the drive rope 10 and the rope guide to the rope deflector 33 assembly.

LIST OF REFERENCE SYMBOLS

1 Sliding door drive
2 Electrical drive unit
3 Rope guide
4 Winding drum
5 Planetary gear
6 Extension
7 Plastic sheathing
8 End of rope guide
9 Holding means
10 Drive rope
11 Sealing means
12 Ball-shaped head
13 Circular-shaped bulges
14 Rope deflector
15 Accommodation
16 Deflector guide wheel
17 Base plate
18 Axis
19 Recesses
20, 21, 22 Borings
23 Opening
24 Upper section
25, 26, 27 Attachment means
28 Slit
29 Seal
30, 31 Contact surface
32 Molding
33 Rope deflector module
C Chassis

The invention claimed is:

1. A drive of a sliding door of a motor vehicle, the drive comprising:
   an electrical drive unit,
   a drive rope,
   a guide for the drive rope,
   at least one rope deflector having an upper section to which the guide is fixed, and a guide wheel, and
   a sealing component that is attachable to the upper section, wherein the guide wheel is insertable into the sealing component to be encompassed by the sealing component,
   wherein the drive unit, the drive rope and the guide are configured to be firmly accommodated in a chassis of the motor vehicle and the sliding door can be moved in respect of the chassis by the drive rope,
   wherein the upper section of the rope deflector is supported in the chassis adjacent a first side of a chassis panel and the sealing component along with the guide wheel is supported outside the chassis adjacent a second side of the chassis panel that opposes the first side, and
   wherein at least one assembly of the guide of the drive rope is of a modular construction and the drive rope can be deflected by the modular assembly.

2. The sliding door drive according to claim 1, wherein one end of the rope of the drive rope can be threaded into the at least one rope deflector.

3. The sliding door drive according to claim 1, wherein the rope guide has a rope guide pipe and the guide pipe has a holder.

4. The sliding door drive according to claim 3, wherein the holder can be inserted into the rope deflector in a form-fitting manner.

5. The sliding door drive according to claim 4, wherein an end of the rope guide and/or the holder can be fixed on the rope deflector by the upper section.

6. The sliding door drive according to claim 1, wherein the drive rope has a sealing collar that forms a sealing unit with the sealing component.

7. The sliding door drive according to claim 1, wherein the modular assembly at least has an attachment for attaching the assembly to the chassis of the motor vehicle.

8. The sliding door drive according to claim 1, wherein the sealing component is attachable to the upper section on a side of the upper section opposing a side to which the guide is fixed.

9. The sliding door drive according to claim 1, wherein the upper section has a base plate and the sealing component has a contact surface that lies adjacent the base plate.

10. The sliding door drive according to claim 6, wherein the sealing collar can be inserted into the sealing component.

11. A drive of a sliding door of a motor vehicle, the drive comprising:
    an electrical drive unit,
    a drive rope, a guide for the drive rope,
a rope deflector connectable to the guide and having an upper section and a guide wheel, wherein the rope deflector extends through a chassis of the motor vehicle to guide the drive rope outside of the chassis, wherein the upper section of the rope deflector is supported in the chassis adjacent a first side of a chassis panel,
a circular seal collar attached to an end of the drive rope, and
a sealing component attached to the rope deflector outside of the chassis for sealing the drive rope outside of the chassis, wherein the sealing component along with the guide wheel is supported outside the chassis adjacent a second side of the chassis panel that opposes the first side,
wherein the seal collar is directly engageable against the sealing component for sealing the drive rope.

* * * * *